March 5, 1935.  E. A. ROCKWELL ET AL  1,993,123

AUTOMATIC CLUTCH

Filed Dec. 3, 1932  3 Sheets-Sheet 3

INVENTORS
Edward A. Rockwell
Elmer V. J. Tower
BY
Arthur Wright
ATTORNEY

Patented Mar. 5, 1935

1,993,123

UNITED STATES PATENT OFFICE 1,993,123

AUTOMATIC CLUTCH

Edward A. Rockwell, Chicago, Ill., and Elmer V. J. Tower, North Syracuse, N. Y., assignors, by mesne assignments, to The Russell Manufacturing Company, Middletown, Conn., a corporation of Connecticut Application December 3, 1932, Serial No. 645,532

2 Claims. (Cl. 192—105)

This invention relates to automatic friction clutches of the well known type in which the clutch elements comprise a driving member and a driven member normally disengaged, and with centrifugal weights or elements which are connected with the driving member and operate upon the rotation thereof to cause engagement between the driving and the driven members of the clutch. It is the purpose of the present invention to improve the construction and mode of operation of the elements forming such automatic clutches, more particularly with respect to the method of operation of the centrifugal elements and also to simplify the construction in various respects.

The present invention is an improvement upon the mechanisms shown in the Tower application Serial No. 557,794 filed August 18, 1931.

While our invention is capable of embodiment in many different forms, for the purpose of illustration we have shown only one form of the device in the accompanying drawings, in which Fig. 1 is an elevation of the automatic clutch made in accordance with our invention;

Figure 1:
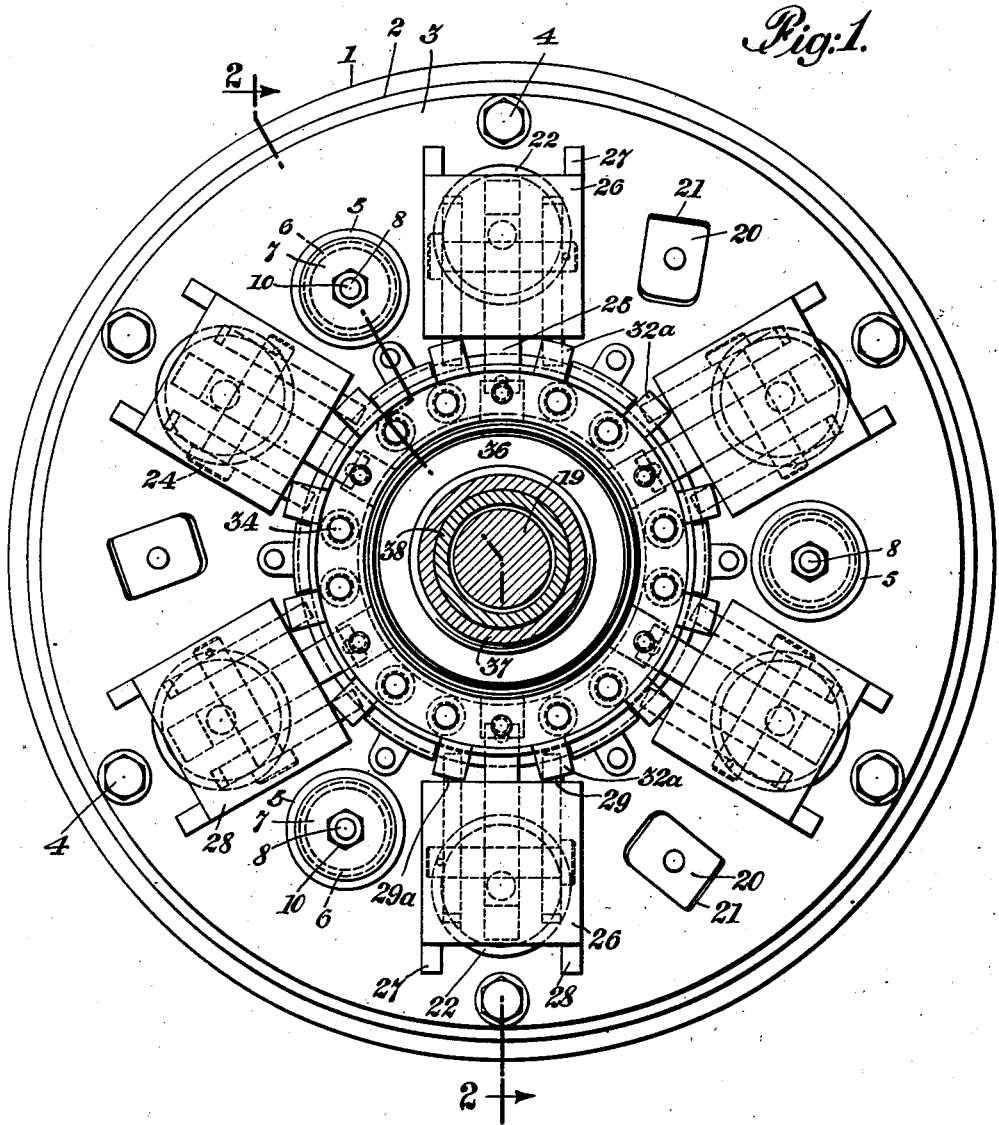
Figure 2:
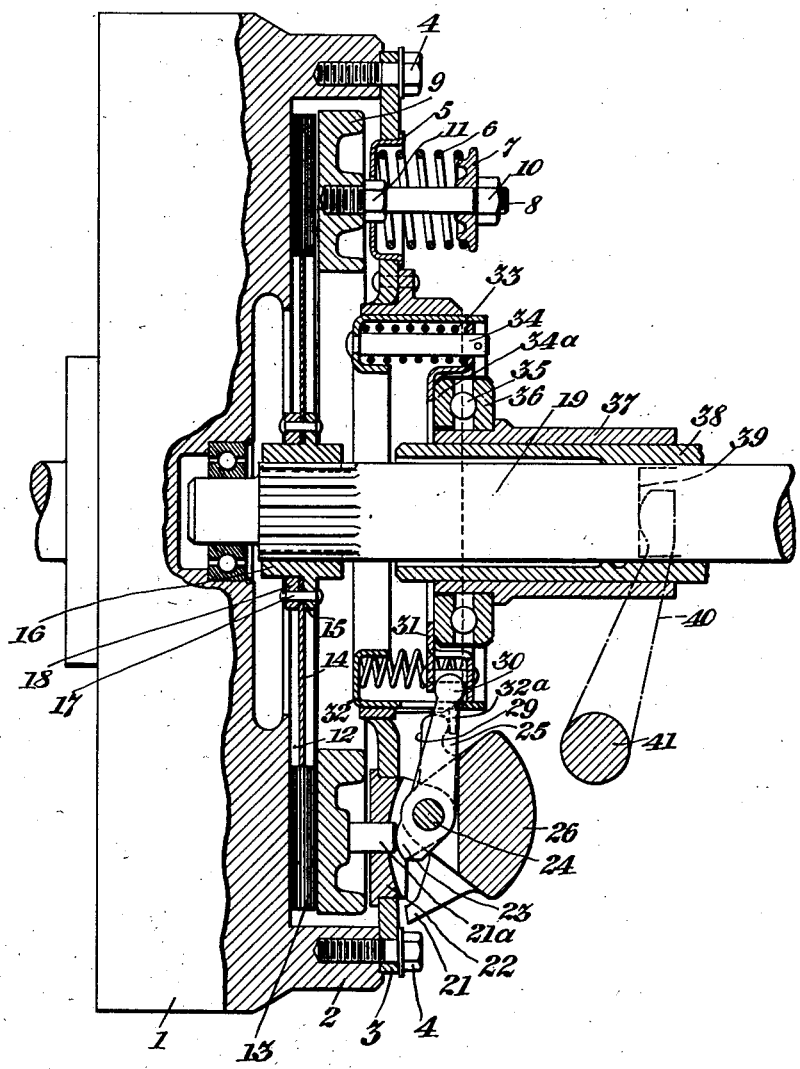
Fig. 2 is a transverse section of the same taken on line 2—2 of Fig. 1.
Figure 3:
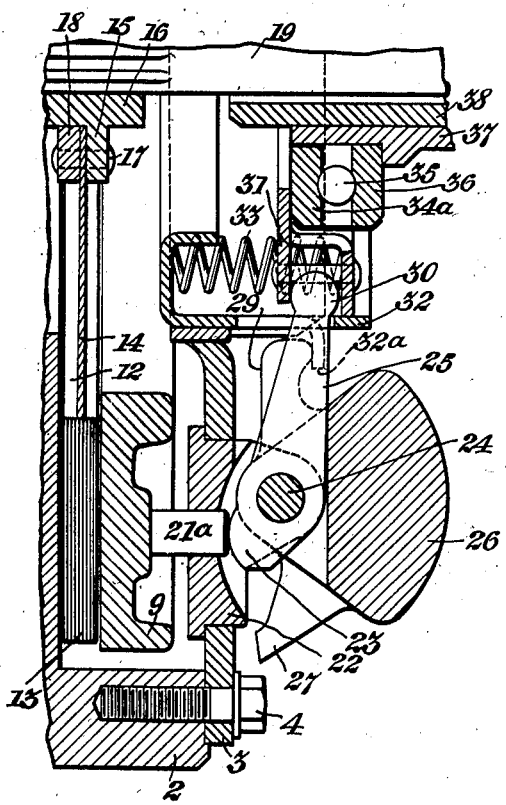
Fig. 3 shows the automatic mechanism about to cause the clutch to engage.
Figure 4:
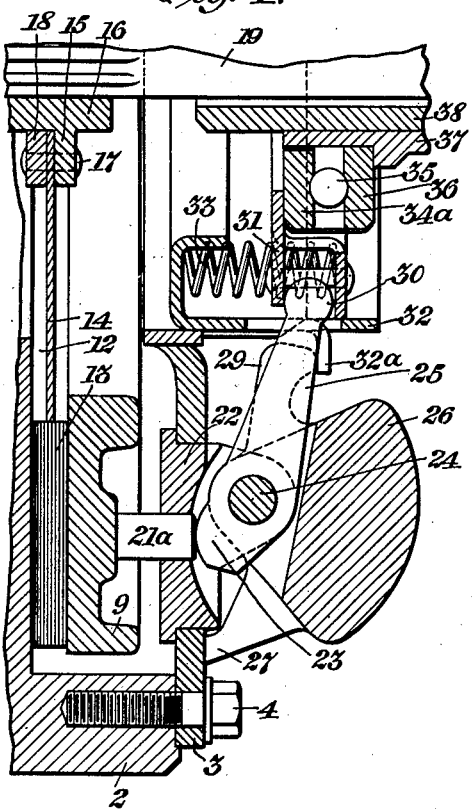
Fig. 4 shows the same mechanism in fully engaged position.
Figure 5:
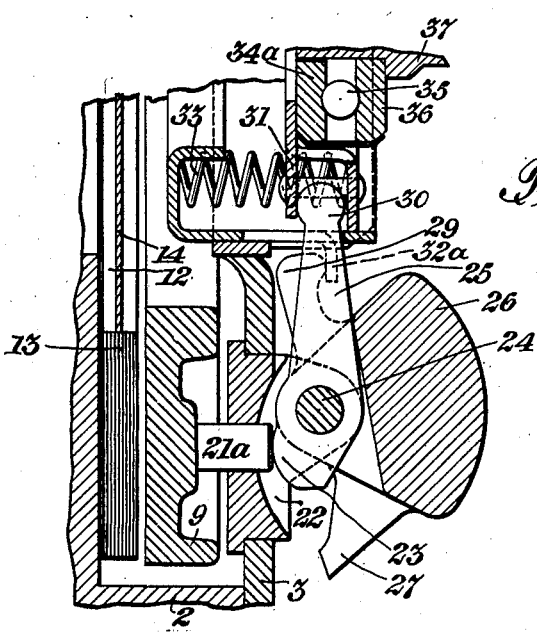
Fig. 5 shows the same mechanism in fully disengaged position as when the car is stationary.

Referring to the drawings, we have shown an engine fly wheel 1 having a peripheral flange 2 on the face of which is attached an annular master plate 3 by means of screws 4. On the face of the annular plate 3 there are located three annular dished supports 5 to receive coil springs 6 seating at their other ends against a washer 7 on bolts 8 which are screw-threaded into an annular presser plate 9, nuts 10 and 11 being provided to hold the springs and bolts 6 and 8 in their fixed adjusted position. The presser plate 9 is arranged so as to engage a driven member 12 of any desired type, composed of a friction element 13 made, for example, of woven material mounted on a disk-shaped member 14 secured in any desired way to a flange 15 on a hub 16 having rivets 17 passing through the same and through a washer 18 mounted on the hub. The hub 16 is splined to a shaft 19 forming a part of the transmission of the automobile. In order to guide and center the presser plate 9 the latter is provided with three lugs 20 which project into slots 21 in the plate 3. In order to carry out the automatic actuation of the presser plate 9 to cause it to engage the friction disk 12, there are arranged around the face of the plate 12 six centrifugal weight mechanisms which are all constructed the same and only one of which will be described in detail accordingly. Each of these mechanisms comprises a pin 21a resting against the face of the presser plate 9 and guided within a circular flanged plate 22 which is set into the plate 3. The upper end of the pin 21a is adapted to be moved inwardly to cause engagement of the presser plate 9 with the friction element 12 by means of a cam 23 carried on a shaft 24 and having an oppositely extending lever arm 25. A centrifugal weight 26 is rotatable on the pivot 24, the same having appropriate recesses to receive the lever 25 and the cam 23. The centrifugal weight 26 is, furthermore, provided with downwardly extending projections 27 and 28 which act as stops against the face of the plate 3 so as to prevent an undue degree of pressure of the presser plate 9 against the friction element 13 such as would necessitate the exertion of an extraordinary degree of manual pressure to disengage the clutch, as, for instance, when shifting gears while the engine is being operated at unduly high speeds. Preferably the stops 27 and 28 prevent the exertion of any greater pressure upon the presser plate 9 than merely that which is required to effectively maintain the frictional engagement of the element 12 with the fly wheel 1. This pressure will, however, of course, increase as the speed of the fly wheel 1 increases. On the weight 26 there are provided two lever arms 29 and 29a. The lever 25 has a bifurcated rounded end 30 which is carried in a guide 31 which is movable within a cage 32 slidable in the master plate 3. The cage 32 also has thereon shoulders 32a against which the lever arms 29 and 29a abut. The cage 32 carries, furthermore, a plurality of coil springs 33 around pins 34 which are supported at their inner ends in said cage 32 and which, at the other ends thereof, press against the guide 31. Bearing against the guide 31 there is a ball-bearing race 34a to receive ball-bearings 35 retained in an outer ring-shaped race 36. The race 36 is carried upon a movable sleeve 37 which is slidably mounted on the outside of an inner sleeve 38 housing the shaft 19. The slidable sleeve 37 is provided with shoulders 39 to cooperate with a yoke 40 on a shaft 41 adapted to be shifted in the usual way by a clutch pedal of the usual type and which is located within reach of the foot of the automobile driver.

In the operation of the automatic clutch, it being assumed that the internal combustion engine in the automobile is in operation, the fly-wheel 1 driven thereby, when the engine is rotating the same at idling speeds, will be in disengagement with the friction element 12, as the springs 6 will have withdrawn the presser plate 9 to a position at which pressure is not exerted by the friction element 12. Also, under these conditions the centrifugal weights 26 will have been moved inwardly towards the presser plate 9 due to the force of the springs 6 and due to the movement of the pins 21a against the cams 23. When, however, the engine is accelerated, as, for instance, by moving the usual throttle lever, the speed of the fly wheel 1 will be greatly increased and the centrifugal weights 26 will, accordingly, tend to assume a position further away from the axle 19, thereby causing the levers 29a through the springs 33 and the levers 25 and the cams 23 to act on the pins 21a, thereby forcing the presser plate 9 against the friction element 12 so as to thus cause the shaft 19, which is splined to the friction disk through the hub 16, to become coupled to the fly wheel 1. As the speed increases this friction engagement will become increased, accordingly, as the centrifugal weights 26 approach their outer limits of movement. However, the weights 26 cannot move so far as to produce any undue pressure of the presser plate 9 in view of the stops 27 and 28 acting against the master plate 3. Therefore, at high speeds the engaging pressure of the clutch will not become so great as to require any undue force or any excessive leverage in order to manually disengage the clutch at any time desired, as, for instance, when it is desired to quickly start the free wheeling of the automobile or when it is desired to shift gears without waiting for the engine to reach an idling speed. It will, of course, be understood that in the operation of the automobile the deceleration of the engine to an idling speed will automatically throw the clutch out of operation due to the withdrawal of the presser plate 9 by the springs 6 and that by this means, also, free wheeling may come into action in the same way by the deceleration of the engine. However, as indicated above, the driver of the car can at any time throw out the clutch by the pressing on the clutch pedal and through the yoke 40, which is connected to the lever arms 25, compress the springs 33 and withdraw the cams 23 so as to permit the springs 6 to remove the pressure of the presser plate 9 from the friction element 12, thus disengaging the clutch.

While we have described our invention above in detail we wish it to be understood that many changes may be made therein without departing from the spirit of the same.

We claim:

1. In an automatic clutch, the combination with a driving member, a normally disengaged driven member, and a presser plate connected to the driving member and adapted to frictionally engage the driven member to drive the same; of operating levers each formed with a cam surface for operating the presser plate to cause clutch engagement, the movement of said operating levers being limited by the clutch engaging pressure; a centrifugal weight for each operating lever pivoted adjacent the lever; springs intervening between the weights and the levers whereby the centrifugal movement of the weights presses through said springs upon the operating levers to engage the clutch; and stops for limiting the movement of the weights beyond the pressure-limited movement of the lever.

2. An automatic clutch as set forth in the preceding claim, combined with manual means having connections for pressing upon said operating levers reversely to the action of the weights and thereby releasing the pressure upon the presser plate to disengage the clutch.

EDWARD A. ROCKWELL.
ELMER V. J. TOWER.